† † ‡
11/21/78      XR      4,126,730

United States Patent [19]
Molari, Jr.

[11] 4,126,730
[45] Nov. 21, 1978

[54] LAMINATES

[75] Inventor: Richard Edgar Molari, Jr., Pittsfield, Mass.

[73] Assignee: General Electric Company, Pittsfield, Mass.

[21] Appl. No.: 761,877

[22] Filed: Jan. 24, 1977

Related U.S. Application Data

[60] Division of Ser. No. 586,630, Jun. 13, 1975, Pat. No. 4,027,072, which is a continuation-in-part of Ser. No. 369,663, Jun. 13, 1973, abandoned.

[51] Int. Cl.$^2$ .................... B32B 9/00; B32B 17/06; B32B 27/36
[52] U.S. Cl. .................... 428/412; 428/426; 428/429; 428/447; 428/448; 428/450; 428/457; 428/537; 428/911
[58] Field of Search ............... 428/412, 442, 447, 911, 428/426, 428, 429, 417, 448, 450, 457, 437

[56] References Cited

U.S. PATENT DOCUMENTS

| | | | |
|---|---|---|---|
| 3,189,966 | 6/1965 | Vaughn | 260/465 R X |
| 3,549,476 | 12/1970 | Dietzel et al. | 428/215 |
| 3,622,440 | 11/1971 | Snedeker | 428/429 |

*Primary Examiner*—Lorraine T. Kendell
*Attorney, Agent, or Firm*—William F. Mufatti

[57] ABSTRACT

Polysiloxane-polycarbonate block copolymers provide ductile, structural adhesive layers for bonding laminates. They are particularly useful as an adhesive and structural element in preparing polycarbonate containing composites which retain their integrity. Laminates of glass, polycarbonate, other resins separately and in various combinations and the adhesive layer provide glazing and structural units of relatively light weight and thickness which have good energy absorption, clarity, strength and integrity and are penetration resistant over a wide range of temperatures.

8 Claims, No Drawings

LAMINATES

This application is a division of Ser. No. 586,630, filed June 13, 1975, now U.S. Pat. No. 4,027,072, which in turn is a continuation-in-part of patent application Ser. No. 369,663 filed June 13, 1973 and now abandoned.

This invention relates to laminates in which the laminae are bonded by particular polysiloxane-polycarbonate block copolymers. More particularly, the invention relates to such laminates in which the special ductile adhesive layer contributes to the structural integrity of the laminates, providing over-all structural units of relatively light weight and thickness which are particularly characterized by improved penetration and spall resistance over a wide range of temperatures.

BACKGROUND OF THE INVENTION

The use of so-called safety glazing or penetration resistant glazing for windows, windshields and the like utilizing polycarbonate resin layers as a structural component are well known. For example, glass polycarbonate resin laminates are described in U.S. Pat. No. 3,666,614, the glass and polycarbonate being sealed together by an ethylene-vinyl acetate copolymer. U.S. Pat. No. 3,520,768 describes laminates of relatively thick glass having a comparatively thin polycarbonate foil inserted therebetween and adhered thereto. While such prior art laminates of this general type are useful for certain purposes, the interlayers or adhesives employed often have low adhesion to polycarbonate or are incompatible to the extent that the polycarbonate is attacked to the point of hazing, stress cracking and even delamination. There is a need for materials which are characterized by superior penetration and spall resistance and which, at the same time, are relatively light in weight and have good clarity, strength and integrity all over the wide range of temperatures, and it is a primary object of the present invention to provide such materials.

DESCRIPTION OF THE INVENTION

This invention relates to laminates which are adhered with particular polysiloxane-polycarbonate block copolymers.

It has been found that these particular polysiloxane-polycarbonate block copolymers can be used in sheet form and laid up into laminates with other materials. Preferably, these other materials are selected from the group consisting of solid resinous materials, glass, and solid structural materials. This solid structural material includes wood, ceramics, metals, cermets, etc.

Any of the usual polycarbonate resins can be used as laminae for the present invention including but not limited to those described in U.S. Pat. Nos. 3,161,615; 3,220,973; 3,312,659; 3,312,660; 3,313,777; 3,666,614, among others, all of which are included herein by reference.

Any of the usual types of glass used in so-called safety applications can be used in conjunction with the present invention including chemically and thermally strengthened or tempered glass as well as common untempered glass where indicated.

Where desirable, adhesion promoting primers can be used to promote adhesion, such material being well known and including, among others, vinyl alkoxy silanes, amino-alkylalkoxy silanes, alkoxy silanes, silyl peroxides and amino-alkoxy silanes, such materials being described in the above U.S. Pat. No. 3,666,614 and elsewhere. A particular advantage of the present invention is that primers or protective layers are not necessary in connection with any polycarbonate or resin used.

The solid resinous materials which may be used include ABS plastics based on combining acrylonitrile, butadiene and styrene; acetal homopolymers; acetal copolymers produced by polymerization of trioxane and ethylene oxide; acrylics; epoxy resins; nylons, those prepared from a diamine and a diacid and those prepared from an amino acid or amino acid derivative; phenolics; polycarbonates; phenylene oxide based resins such as polyphenylene oxide and blends of polyphenylene oxide and styrene resins; polyaryl ethers; polyesters, polyethylenes; polyphenylene sulfides; polypropylene; polysulfones; polyurethanes; silicones; ethylene polymers such as ethyl vinyl acetates; conductive plastics; and ordered aromatic copolymers, etc. These solid resinous materials can be formed into sheets. Other materials which may be included within the scope of this invention are described in U.S. Pat. No. 3,662,440, which is incorporated herein by reference.

The polysiloxane-polycarbonate block copolymers can be expressed by the average formula:

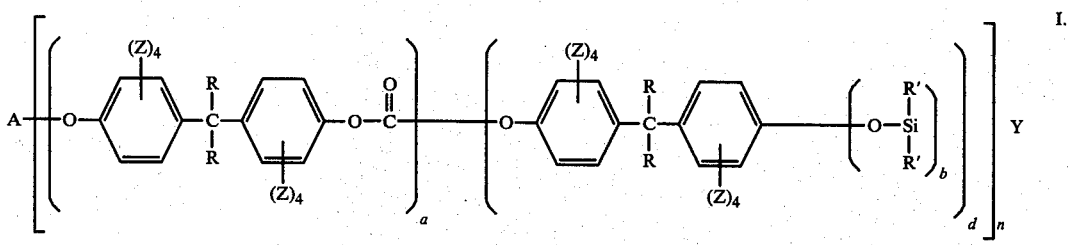

where $n$ is at least 1, and preferably $n$ is an integer equal to from 1 to about 1000, inclusive, $a$ is equal to from 1 to about 200, inclusive, $b$ is equal to from about 5 to about 200, inclusive, and preferably $b$ has an average value from about 15 to about 90, inclusive, while the ratio of $a$ to $b$ can vary from about 0.05 to about 3, inclusive, and when $b$ has an average value of from about 15 to about 90, inclusive, the ratio of $a$ to $b$ is preferably from about 0.067 to about 0.45, inclusive, and $d$ is 1 or more, Y is

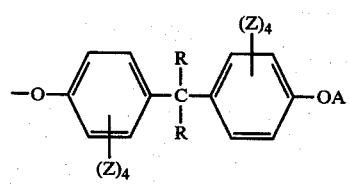

A is a member selected from the class of hydrogen and

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, R" is a member selected from the class consisting of monovalent hydrocarbon radicals and halogenated hydrocarbon radicals, and Z is a member selected from the class of hydrogen, lower alkyl radicals and halogen radicals and mixtures thereof.

Included within the radicals represented by R of Formula 1 are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aforementioned radicals, while R is preferably methyl, R' includes all radicals included by R above except hydrogen, where R' also can be all the same radical or any two or more of the aforementioned R radicals except hydrogen, and R' is preferably methyl. R' also includes, in addition to all the radicals included by R, except hydrogen, cyanoalkyl radicals such as cyanoethyl, cyanobutyl, etc. radicals. Radicals that are included within the definition of Z of Formula 1 are hydrogen, methyl, ethyl, propyl, chloro, bromo, iodo, etc. and combinations thereof, and Z is preferably hydrogen.

The hydrolytically stable copolymers of the present invention can be further described as comprising recurring copolymeric units of a polydiorganosiloxane joined by substituted aryloxy-silicon linkages to a polyester of dihydric phenol and a precursor of carbonic acid, where each of said recurring copolymeric units comprises by average weight from about 10% to about 75% of said polydiorganosiloxane, and preferably from about 40 to 70% by weight.

The copolymers of Formula 1 can be produced by reacting at temperatures in the range of 0° C. to 100° C., preferably 20° C. to 50° C., and in the presence of an acid acceptor, a mixture of a halogen chain-stopped polydiorganosiloxane having the formula

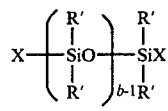

II.

and a dihydric phenol having the formula

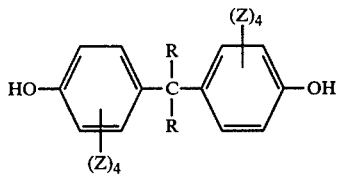

III.

and thereafter phosgenating said reaction product until the resulting copolymer achieves a maximum intrinsic viscosity, where R, R', Z and b are as defined above, and X is a halogen radical, preferably chloro.

The halogen chain-stopped polydiorganosiloxanes of Formula 2 can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4 to about 35%, by weight, and preferably from about 1 to about 10% by weight of said halogen chain-stopped polysiloxane. The halogen chain-stopped polysiloxane is preferably in the form of a chlorinated polydimethylsiloxane.

Dihydric phenols that are included in Formula 3 are, for example, 2,2-bis(4-hydroxyphenyl)-propane (bisphenol-A); 2,4'-dihydroxydiphenylmethane; bis-(2-hydroxyphenyl)-methane; bis-(4-hydroxyphenyl)-methane; 1,1-bis(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxyphenyl)-propane, 2,2-bis-(3-isopropyl-4-hydroxyphenyl)-propane, etc. Mixtures can also be used. Others will occur to those skilled in the art.

The copolymers of the present invention essentially comprise recurring units consisting of a polydiorganosiloxane interconnected by substituted aryloxy-silicon linkages to a polyester of carbonic acid precursor and a dihydric phenol.

Materials of the above nature are also described in U.S. Pat. No. 3,189,662 included herein by reference and can be used either alone as such or in conjunction will well known modifiers to provide particular desired characteristics.

While the above U.S. Pat. No. 3,189,662 states that the above block copolymers are useful as binding materials for parts and laminates and in adhesive formulations, it was unexpectedly found that when such materials are used in sheet form and laid up into laminates variously with other materials such as polycarbonates, other resins and glass, they provide not only excellent adhesive properties but in effect enter into and enhance the laminate structure, providing improved strength and ductility over an extremely wide range of temperatures. These physical characteristics, accompanied over such wide range of temperatures by salutary weather resistance and optical clarity, make them particularly useful in so-called safety glazing applications here resistance to penetration and spalling from the impact of flying objects such as bullets, rocks, missiles, and the like is desirable. It will be realized, of course, that while optical clarity and lack of color are desirable in many cases, one or more of the laminates can be tinted or colored as desired to provide light screening and the like. It will be also realized that light and heat stabilizers can be employed where indicated.

As pointed out above, it has been found that laminates using the present block copolymers as an adhesive and structure layer are characterized by good properties over a wide range of temperatures, particularly as compared to usual high penetration resistant laminates such as those using polyvinyl butyral as the interlayer in glass laminates.

In preparing the present laminates, the laminae or layers are laid up as desired and bonded as indicated using pressure or heat and pressure. The bonding can be accomplished using presses, autoclaves, rollers, vacuum bags, vacuum rings and the like, all of which are well known to those skilled in the art.

There are no apparent limitations on the thickness or size of the laminates as well as on the number of layers that may be employed in preparing such laminates.

The polycarbonate, glass, solid resinous materials and solid structural material may be used individually or in any combination as long as the polysiloxane-polycarbonate block copolymer adhesive layer is present between one or more of these laminae. Thus, the laminate may contain polycarbonate, said block copolymer and polycarbonate; glass, said block copolymer and glass for example. Also, the laminate includes successive layers of polycarbonate and said block copolymer; glass and said block copolymer; acrylic and said block copolymer, for example. The laminates of this invention include combinations of polycarbonate, glass and acrylic with other materials such as: glass, said block copolymer and polycarbonate; glass, said block copolymer, polycarbonate, said block copolymer, polycarbonate, said block copolymer and glass; glass, said block copolymer, polycarbonate, said block copolymer and polycarbonate; acrylic, said block copolymer, glass, said block copolymer, polycarbonate; polymethyl methacrylate, said block copolymer, polycarbonate, acrylic, glass, for example. Also, the laminates of this invention include successive layers of lamina within the combination of materials such as, for example: glass, said block copolymer, polycarbonate, successive layers of said block copolymer and polycarbonate, said block copolymer and glass; glass, said block copolymer, polycarbonate, successive layers of polycarbonate and said block copolymer.

The present laminates may be bonded to other materials which may be used for walls, partitions, or other solid barriers such as fiberglass, reinforced plastic board, particle boards, etc.

DESCRIPTION OF THE PREFERRED EMBODIMENT

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

There were prepared flat laminates useful for automotive windshields about 2' × 3' having two 3/32 inch thick float glass outer layers with a 30 mil thick interlayer film of polyvinyl butyral or the present block copolymer. In using the block copolymer, a primer of gamma amino propyl triethoxy silane was used on the glass surface adjacent the block copolymer. The laminates were de-aired and tacked and then consolidated in an autoclave at about 280° F. and a pressure of about 275 psi for 15 minutes. Such laminates were tested for impact using a 22 lb. headform which is representative of the upper human torso which was impacted against the laminates at right angles at various velocities. The 22 lb. headform test was developed by the SAE Glazing Committee in 1962 to assess the penetration resistance and deceleration characteristics of glazing materials. The 22 lb. headform contains a triaxial accelerometer to determine the forces on the head during impact. SAE Severity Index (SI) can be calculated meaningfully only on those specimens which support the 22 lb. headform. The lower the value of SI, the less the likelihood that dangerous concussive type injury will occur. Reference is made to Proceedings of Fifteenth Stapp Car Crash Conference, November 17-19, 1971, published by the Society of Automotive Engineers, Inc. for a discussion of Severity index (SI).

At 120° F. when the headform was impacted against a polyvinyl butyral interlayer laminate at 19.3 mph, there was total penetration of the laminate. SI is meaningless in this case because of penetration but was measured at 98. Using a laminate having the present block copolymer as an interlayer and with a headform velocity of 18.9 mph, there was no penetration and an SI of 98. At 73° F. a polyvinyl butyral interlayer laminate impacted as above at 21.2 mph, experienced no penetration and an SI of 220. Using a laminate with the present block copolymer interlayer as above and an impact velocity of 21.1 mph, the SI was 158 with no penetration. At 0° F. and 20.0 mph the present material showed no penetration and an SI of 208. Using polyvinyl butyral, penetration was experienced at 17.2 mph. At 16.4 mph, both the polyvinyl butyral and present material had no penetration but the SI of the polyvinyl butyral was 285 compared to only 228 for the present material.

At all of the above temperatures the present material has a lower SI and better penetration resistance. The magnitude of the differences is especially apparent at the extremes of the temperatures at which testing took place.

The particular block copolymer used in the above laminate was General Electric LR 3320. This material has a specific gravity of 1.12, a tensile strength of 2600 to 3200 psi, an elongation of 300 to 390, a tear strength (Die C) of 400 lbs/in., and a brittleness temperature below −76° F., and a heat deflection temperature (10 mils under 66 psi Load) of 160° F.

The above laminates comply with American National Standards Institute Standard USAS Z26.1-1966 item 1 relative to automotive safety glazing.

Laminates constructed using the present block copolymers also find particular application in locomotive windshields and glazing as well as transportation glazing in general where resistance to rocks and other missiles or flying objects is desirable. At the same time, resistance to spalling on the inboard side and protection of the occupants from flying chards or splinters of glass is desirable. The assembled layers are heated in a vacuum bag to 250° F. and pressurized to 250 psi for 45 minutes at temperature. The laminates are then cooled slowly under pressure to 120° F. and removed. A particular locomotive windshield or windscreen consists of an outboard layer of 250 mils of primed strengthened glass, an interlayer of 60 mils of LR 5630 block copolymer and an inboard layer of 250 mils of polycarbonate sheet with an outboard abrasion-resistant coating made by General Electric. Such a windshield defeats penetration by heavy objects and at the same time precludes flying glass in the cab interior.

While the above inboard polycarbonate layer is quite scratch resistant in and of itself, a so-called microglass layer made by Corning can be added. This glass layer is scratch resistant and at the same time precludes flying glass particles which might injure personnel. Another laminate particularly useful in side windows, for example, of rapid transit cars was prepared using vacuum rings with the immediately preceding heat and pressure cycle consisting of an outboard 125 mil thick sheet of strengthened glass, an interlayer of 60 mils of the above LR 3320 block copolymer and an inside or inboard layer of polycarbonate about 125 mils thick coated on the outer side with abrasion-resistant material.

LR 5630 block copolymer has a specific gravity of 1.07, a tensile strength of 2200 to 2500 psi, an elongation of 500–700%, a tear (Die C) of 200 lbs/in., and a brittle temperature below −76° F. and a heat deflection temperature (66 psi) of 130° F.

The present laminates also find use in so-called security glazing, such glazing itself being used in place of bars or metal reinforced glass or combinations of glass and bars in penitentiaries and other similar applications. Such laminates can, if desired, be provided with conductive materials such as interlaid wire which, when and if broken, would actuate a security alarm. Typical of security glazing for an alarm is one prepared using a vacuum bag as above with a temperature of 275° F., a pressure of 250 psi and a hold time of 30 minutes at temperature, and having an outboard layer of 125 mils of primed glass, an interlayer of 30 mils of the above LR 3320 block copolymer, a 250 mil thick layer of polycarbonate, another interlayer of 30 mils of the above LR resin having interlaid thereon, as desired, an alarm wire and finally an inboard or inner layer of about 125 mils of glass.

Security glazing without the alarm feature can be provided by simply omitting the alarm wire in the above example. Conductive layers can also be used. Such electrical inserts can also be used for heating.

The above security glazing complies with American National Standards Institute Standard ANSI Z97.1-1972, there being no fracture of the glazing surface after repeated impacts at the 400 ft-lb. energy lebel.

Laminates using the present block copolymers as an interlayer find use also in applications where resistance to high speed forceful missiles such as bullets is desirable, such laminates finding application in glazing, taxicab partitions, tellers' windows, and the like.

EXAMPLE II

There was prepared a laminate having three plies of polycarbonate with one ply of 15 mil LR 3320 block copolymer between each of the adjacent polycarbonate sheets. When this laminate was subjected to the UL 752 Standard test for resistance to bullets, there was no penetration or spalling of the inboard layer using medium power (Super 38 automatic), high power (0.357 magnum revolver), or super power (0.44 magnum revolver) small arms ammunition and weapons. Tests were performed at room temperature, 120° F., and one side at −25° F. according to the standard. This laminate was prepared using a vacuum ring and a temperature of 250° F. and a pressure of 200 psi for a 30 minute hold time.

EXAMPLE III

There was prepared a bullet resistant laminate having an outer layer of 125 mils of primed strengthened glass, an interlayer of 60 mils or the mentioned LR 5630 block copolymer, a layer of 250 mils of polycarbonate, an interlayer of 30 mils of the mentioned LR 3320 block copolymer, and an inboard ply of 375 mils of polycarbonate. When tested at room temperature according to UL Standard 752 for Bullet Resisting Glazing, it was both penetration and spall resistant to super 38 and 0.357 magnum ammunition. This laminate was prepared in a vacuum bag using a temperature of 250° F. and a pressure of 250 psi and a hold time of 45 minutes.

EXAMPLE IV

The present laminates are also useful for gas mask lenses, which are ductile, penetration and abrasion resistant and retain their qualities and flexibility and clarity over a wide range of temperatures. There were bonded together in a platen press at 290° F. and 200 psi for 10 minutes, using 60 mils of LR 4330 block copolymer, about two mils of mar-resistant coated polycarbonate and about one mil of polyvinylidene chloride (SARAN). This was repeated using polyethylene terephthalate film (MYLAR) in place of polyvinylidene chloride as the permeation-resistant layer. Lenses so prepared were flexible and clear over a range of from below −25° F. to 150° F. LR 4330 has a specific gravity of 1.09, a tensile strength of 2600 psi, a tear strength (Die C) of 320 pounds per inch, a brittleness temperature of less than −76° F. and a heat deflection temperature (10 mils under 66 psi load) of 190° F.

EXAMPLE V

A laminate was made using polymethyl methacrylate $\frac{1}{8}''$ thick and $\frac{1}{8}''$ annealed polycarbonate with an interlayer of 15 mils of LR-3320. Prior to lamination, the polycarbonate was treated for 4 hours at 285° F. and allowed to cool overnight. The laminate was prepared in a steam heated platen press starting at 100° F. and raising the temperature to 275° F. for 30 minutes at 200 psi, cooling for 5 minutes to ambient under 200 psi pressure. To prevent sideways extrusion of the acrylic edge guides were used as a mold.

The laminate prepared as indicated was further modified to bond the acrylic surface to $\frac{1}{8}''$ thick potassium ion exchanged soda lime glass utilizing a cast-in-place acrylic-based interlayer system. The cast-in-place techniques utilized were standard state of the art with an overnight room temperature cure.

The resultant laminates with or without one glass surface are useful for ballistics and fragment resistance. In either case, the polycarbonate surface should be positioned opposite the impacting projectile.

It will be realized that the above examples are typical only of the practice of the invention. Thus, greater and lesser thicknesses of the various layers can be used where indicated. Likewise, while specific processes have been described in connection with the examples, generally speaking other methods of laminating can be adapted to the making of the exemplary structures. It will also be realized that the block copolymer can be used in solution form.

The present invention finds use in any of a number of applications and particularly where high strength or impact resistance are prescribed along with clarity and integrity. Among such uses are glazing generally, windshields, telephone and waiting booths, bank windows, lenses, lighting fixtures, vending machines, decorative glazing and the like. As pointed out above, electric wires or conductive layers can be located within the laminates for alarm or heating purposes.

What I claim as new and desire to secure by Letters Patent of the United States is:

1. A laminate of glass and other material selected from the group comprising solid resinous material, glass, wood, ceramics, metals and cermets and having as adhesive interlayer block polysiloxane-polycarbonate copolymer prepared by reacting (A) a halogen chain-stopped polydiorganosiloxane composed of from about 5 to 200 chemically combined diorganosiloxy units consisting essentially of dialkylsiloxy units which are connected to each other by silicon-oxygen-silicon linkages wherein each of the silicon atoms has two organo radicals attached through a carbon-silicon bond, and (B) a dihydric phenol having the formula

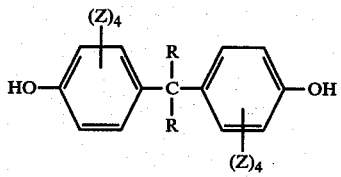

where Z is a member selected from the class consisting of hydrogen, lower alkyl radicals and halogen radicals and combinations thereof, and R is a member selected from the class consisting of hydrogen, hydrocarbon and halogenated hydrocarbon radicals, and phosgenating the purified reaction product until the resulting copolymer achieves a maximum intrinsic viscosity.

2. A laminate as in claim 1 wherein the other material is glass.

3. A laminate as in claim 1 wherein the other material is a solid resinous material.

4. A laminate comprising successive layers of glass, block polysiloxane-polycarbonate copolymer prepared by reacting (A) a halogen chain-stopped polydiorganosiloxane composed of from about 5 to 200 chemically combined diorganosiloxy units consisting essentially of dialkylsiloxy units which are connected to each other by silicon-oxygen-silicon linkages wherein each of the silicon atoms has two organo radicals attached through a carbon-silicon bond, and (B) a dihydric phenol having the formula

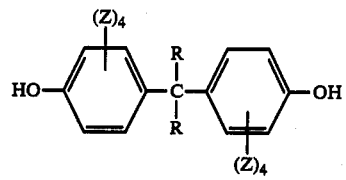

where Z is a member selected from the class consisting of hydrogen, lower alkyl radicals and halogen radicals and combinations thereof, and R is a member selected from the class consisting of hydrogen, hydrocarbon and halogenated hydrocarbon radicals, and phosgenating the purified reaction product until the resulting copolymer achieves a maximum intrinsic viscosity, polycarbonate, said block copolymer, polycarbonate, said block copolymer and glass.

5. A laminate comprising successive layers of glass, block polysiloxy and polycarbonate copolymer prepared by reacting (A) a halogen chain-stopped polydiorgano-siloxane composed of from about 5 to 200 chemically combined diorganosiloxy units consisting essentially of dialkylsiloxy units which are connected to each other by silicon-oxygen-silicon linkages wherein each of the silicon atoms has two organo radicals attached through a carbon-silicon bond, and (B) a dihydric phenol having the formula

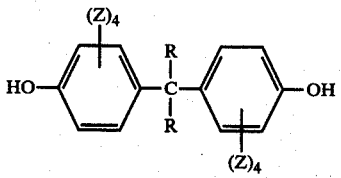

where Z is a member selected from the class consisting of hydrogen, lower alkyl radicals and halogen radicals and combinations thereof, and R is a member selected from the class consisting of hydrogen, hydrocarbon and halogenated hydrocarbon radicals, and phosgenating the purified reaction product until the resulting copolymer achieves a maximum intrinsic viscosity, polycarbonate, said block copolymer and polycarbonate.

6. A laminate as in claim 1 having included therein electrically conductive material.

7. A laminate as in claim 1 wherein the glass and block copolymer surface adjacent each other are primed with an adhesion promoting primer.

8. A laminate as in claim 5 wherein the exposed surface of polycarbonate has a mar-resistant coating.

* * * * *